(12) United States Patent  (10) Patent No.: US 7,568,132 B2
Nakayama et al.  (45) Date of Patent: Jul. 28, 2009

(54) FAULT DATA EXCHANGE BETWEEN FILE SERVER AND DISK CONTROL DEVICE

(75) Inventors: Shinichi Nakayama, Chigasaki (JP); Shizuo Yokohata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 384 days.

(21) Appl. No.: 10/251,154

(22) Filed: Sep. 20, 2002

(65) Prior Publication Data

US 2003/0061549 A1  Mar. 27, 2003

(30) Foreign Application Priority Data

Sep. 21, 2001 (JP) .............................. 2001-288010

(51) Int. Cl.
  *G06F 11/00* (2006.01)
(52) U.S. Cl. .......................................... 714/48; 714/57
(58) Field of Classification Search ................... 714/43, 714/48, 57
  See application file for complete search history.

(56) References Cited

U.S. PATENT DOCUMENTS

| 5,781,716 A | * | 7/1998 | Hemphill et al. ................ 714/4 |
| 6,163,853 A | * | 12/2000 | Findlay et al. .................. 714/4 |
| 6,170,067 B1 | * | 1/2001 | Liu et al. ....................... 714/48 |
| 6,349,333 B1 | * | 2/2002 | Panikatt et al. ............... 709/223 |
| 6,636,981 B1 | * | 10/2003 | Barnett et al. ................... 714/4 |
| 6,976,060 B2 | * | 12/2005 | Manczak et al. ............. 709/219 |
| 6,990,601 B1 | * | 1/2006 | Tsuneya et al. ................. 714/4 |
| 7,047,100 B2 | * | 5/2006 | Kitamoto et al. ............. 700/121 |
| 7,325,051 B2 | * | 1/2008 | Das et al. ..................... 709/223 |
| 2002/0124124 A1 | * | 9/2002 | Matsumoto et al. ......... 710/105 |

FOREIGN PATENT DOCUMENTS

| EP | 1115225 A | 7/2001 |
| JP | 2001-005617 | 1/2001 |
| JP | 2001-084112 | 3/2001 |

OTHER PUBLICATIONS

European Patent Office (EPO) search report for patent application EP02019220.9 (Feb. 23, 2009).

* cited by examiner

*Primary Examiner*—Gabriel L Chu
(74) *Attorney, Agent, or Firm*—Townsend and Townsend and Crew LLP

(57) ABSTRACT

A network storage system has a structure for notifying the data storage system of a fault in the file server, the storage system having means for sending fault notification data to an external maintenance center. The file server can detect a fault and transmit data regarding the fault to the storage control unit while specifying a predetermined logic unit of the storage control unit, and the storage control unit has a faulty part management table, a function for storing the fault-related data transmitted from the file server unit separately from the data exchanged with the computers, a function for detecting a fault other than the fault in the file server unit and for storing that data in the faulty part management table, and a function for transmitting all or part of the faulty part management table to an external unit.

6 Claims, 5 Drawing Sheets

FIG.2

ADDRESS MANAGEMENT TABLE

| PORT NO. | AL-PA | LUN | CONTROL DEVICE |
|---|---|---|---|
| A | EF | 0 | NO |
| A | EF | 1 | NO |
| A | EF | 2 | YES |
| B | E8 | 0 | NO |
| B | E8 | 1 | NO |
| B | E8 | 2 | YES |

FIG.3

FAULTY PART MANAGEMENT TABLE

| ENTRY NO. | FAULTY PART | PART NO. | KIND OF PART |
|---|---|---|---|
| 1 | FILE SERVER | 107 | A |
| 2 | CONTROL PROCESSOR | 120 | B |
| 3 | DRIVE | 115 | B |
| 4 | LAN | 104 | A |
| 5 | ERROR LOG | 140 | A |
| 6 | | | |
| 7 | | | |

FIG.4

CONFIGURATION DATA TABLE 400

| LUN (401) | CONTROL DEVICE (402) |
|---|---|
| 0 | NO |
| 1 | NO |
| 2 | YES |

FAULT DATA EXCHANGE BETWEEN FILE SERVER AND DISK CONTROL DEVICE

BACKGROUND OF THE INVENTION

1. Field of the Invention

This invention relates to an NAS (network attached storage) system and, particularly, to technology which provides the client computers with means for monitoring faults in the system.

2. Description of the Related Art

In recent years, the quantity of data handled on the internet has strikingly increased and data storage has become more important. When accumulated, increased, integrated and unified, the data offer enhanced additional value, and the accumulated data receive expanding demands.

Storage area network (SAN)-connected disk array subsystems have heretofore been introduced into the data storage market, and attempts have been made to integrate and unify the data relying upon the scalability in both performance and capacity and upon a variety of intelligent functions. In recent years, the data storage system has been expanded to a network attached storage (NAS) device and to a file server that attempts to unify the data so that the data can be favorably used by sharing the file among client computers that are spanning dissimilar platforms.

Technologies related to storage servers connected to the network have been specifically disclosed in Japanese Patent Laid-Open Nos. 5617/2001, 84112/2001 and U.S. Pat. No. 5,781,716. According to Japanese Patent Laid-Open Nos. 5617/2001, 84112/2001, the client computers and the file server are connected through a LAN (local area network), and the file server is connected to a storage control unit.

According to U.S. Pat. No. 5,781,716, file servers connected to a local area network (LAN) are connected to client computers that are not shown. The file servers monitor each other. When the file server on one side breaks down due to a fault, the remaining file server takes over the processing to continue the file input/output processing to and from the client computers, thus constituting a fault tolerant system. In the technologies of all of these publications, however, the client computers and the file servers are connected through a LAN, and the storage system is connected to the file servers.

An advantage of NAS is that a file server function exists between the client computers and the storage system, and that the hardware structure of the storage system need not be taken consideration and can thus be concealed. When concealed, however, it becomes difficult to detect a fault in the storage system though a fault, so far, could have been directly detected from the host computer.

In a network system equipped with two file servers that monitor each other for their states and take over the processing of the file server that has become faulty as is done in U.S. Pat. No. 5,781,716, it becomes more difficult to detect the fault and to locate the faulty part. Namely, it becomes difficult to distinguish whether the fault is in the file server, in the LAN connecting the client computers to the servers or in the interface between the file servers and the storage.

In the technologies disclosed in Japanese Patent Laid-Open Nos. 5617/2001 and 84112/2001, in a case where the file is not accessible from the client computer, it is not possible to distinguish whether a fault is in the file server or in the data storage system. In addition, there is no means for fault notification. Further, if reference is made to a log file in a client computer, which appears to be free of fault, there have been, in many cases, recorded errors in the application that operates on the client computer, errors in the host bus adapter and in other hardware, and various error data from the data storage system. Such data can become known only through a particular means for providing notice to an external unit, such as a fault monitoring device. A fault is often found for the first time only after the client computer has broken down. Further, a conventional computer system in an open environment includes a protocol through which a computer receives a notice from the data storage system and an AEN (asynchronous event notification), which is a notice of asynchronous event. When a similar environment is expressed by an SCSI (small computer system interface) standard, there is a protocol through which the initiator receives a notice from a target. However, the above protocols have not been widely used, and are not enough to serve as means for fault notification to the client computers connected to the network.

BRIEF SUMMARY OF THE INVENTION

This invention provides a network storage system capable of locating a defective part and sending notification of the fault to an external unit. The faulty part may include a fault that can be detected by the client computer; a network fault between a client computer and a file server unit (or a file server function, the same holds hereinafter); a fault in the file server unit; a fault in the fiber channel interface between the file server and the disk control unit, which is a storage control unit; a fault in the disk control unit itself; and a fault in the disk unit.

The invention further provides a network storage system capable of specifying the kind of the fault and of sending fault notification to an external unit. The kind of fault may include a file server unit that is at a front end, a disk control unit which is a storage control unit at a back end, and a subordinate unit. The invention further provides a network storage system capable of notifying an external unit of a fault detected by the file server unit or by the file server function.

To solve these problems, the invention includes a structure for fault notification to a disk control unit from a file server unit or a file server function and a function for receiving the notice, means or function for monitoring the faulty state in the data storage system, and means or function for sending fault notification from the disk control unit to an external unit. The faulty state is managed by a faulty part management table.

The disk control unit is a subordinate concept of the storage control unit, which controls the input/output of data relative to the magnetic disk, magnetic tape, optical disk, magneto-optic disk, floppy disk and any other data storage media.

BRIEF DESCRIPTION OF THE DRAWINGS

FIG. 2 is a diagram illustrating an exemplary address management table 200 included in common control data 130;

FIG. 3 is a diagram illustrating an exemplary faulty part management table 300 included in common control data 130;

FIG. 4 is a diagram of an exemplary data table 400 existing in file server 107 and in file server 108, respectively, and corresponding to the file servers 112 and 113 in FIG. 1.

DESCRIPTION OF THE PREFERRED EMBODIMENTS

Figure 1:
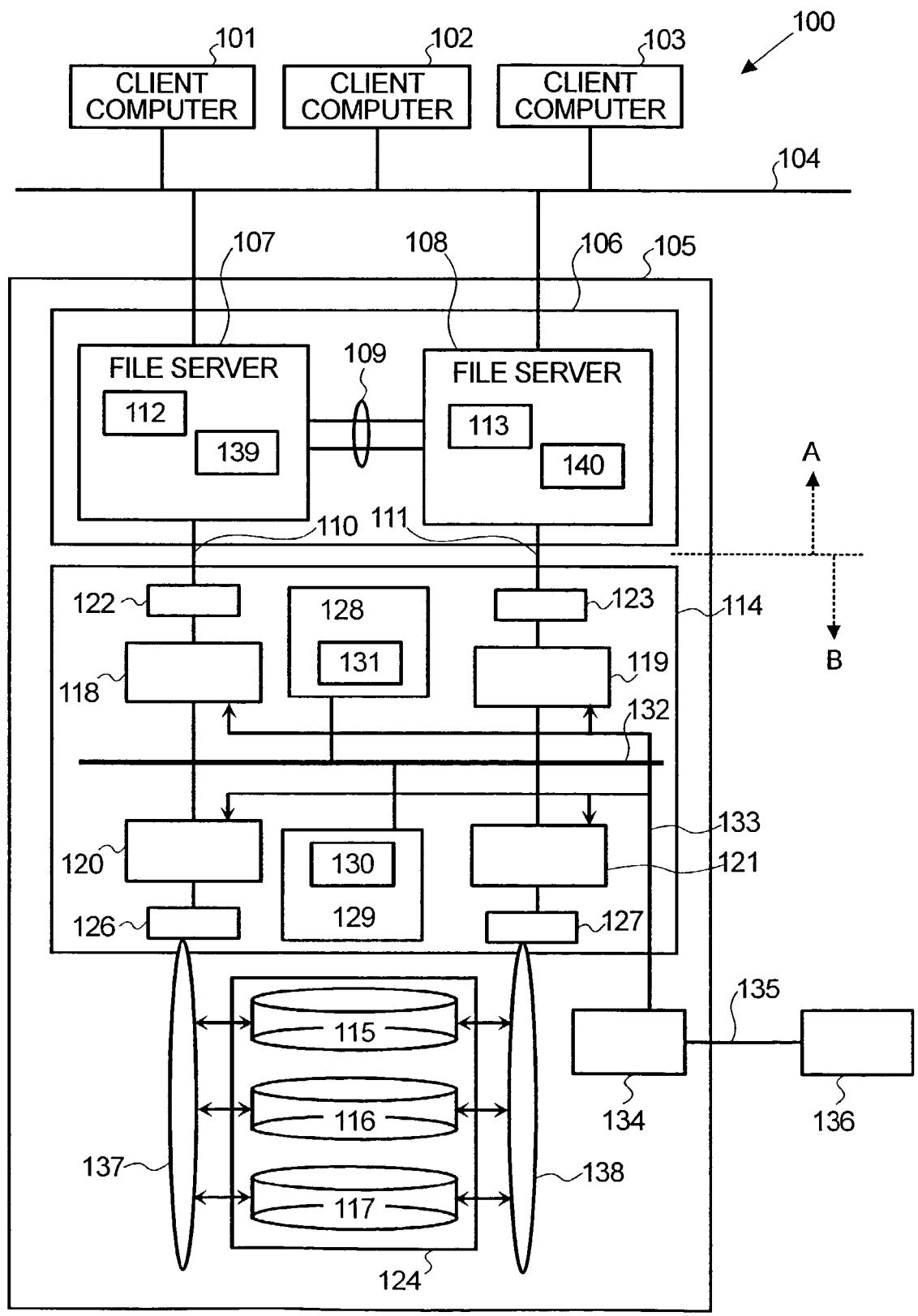
FIG. 1 is a diagram illustrating the configuration of a system having a network storage system 105 according to a first embodiment of the invention.

An embodiment of the present invention is now described in detail with reference to the drawings. FIG. 1 is a diagram 100 illustrating the configuration of a system having a network storage system 105 which includes a disk subsystem with a cache memory 128 and file servers 107 and 108 to which the present invention is adapted.

The higher side of the network storage system 105 is connected to client computers 101, 102 and 103 through a LAN 104 which is formed by an Ethernet. The operating system (hereinafter abbreviated as OS) of the client computer 101 is Windows® 2000 of Microsoft Co., the OS of the client computer 102 is Solaris® of Sun Microsystems Co., and the OS of the client computer 103 is HP-UX of Hewlett-Packard Co. The network storage system 105 includes a file server unit 106, a disk control unit 114 and a magnetic disk unit portion 124 as principal constituent elements.

The file server unit 106 includes a file server 107 and a file server 108. The server unit 106 executes file input/output processing to and from the computers 101, 102 and 103 with a file system different from the OSs of the client computers 101, 102 and 103. In this embodiment, the file servers 107 and 108 are mounting IRIX® of Silicon Graphics Co., which is a UNIX-type OS, and are equipped with a "CX file system (CXFS)" which operates on this OS.

The file server 107 and the file server 108 are connected to each other through signal lines 109 to monitor each other's state. For example, if the file server 107 fails to operate due to a fault or any other trouble, the file server 108, which has detected this state, takes over the job of the file server 107 to continue the file input/output processing requested by the client computers 101, 102 and 103.

The file server unit 106 and the disk control unit 114 are connected through fiber channel interfaces 110 and 111. The place where the fiber channel interface 110 is connected is referred to as port A, and the place where the fiber channel interface 111 is connected is referred to as port B. The file servers 107 and 108 include configuration data tables 112 and 113, respectively. The tables 112 and 113 will be described later in detail.

Error log files 139 and 140 in the file servers 107 and 108 record time of transition of errors in the host bus adapter, such as in hardware connected to the servers 107 and 108 and in the power source as detected by the OS or in an application of the servers 107 and 108. The error log file is usually called syslog, and necessarily exists in the system that has the OS.

The disk control unit 114 is connected to the magnetic disk unit portion 124 through fiber channel loops 137 and 138 to write data into, or read data from, the magnetic disk units 115, 116 and 117 in response to a request from the file server unit 106. The magnetic disk unit portion 124 is composed of a plurality of magnetic disk groups. Transmission of data between the file server unit 106 and the magnetic disk units 115, 116, 117 is controlled by control processors 118, 119, 120 and 121 in the disk control unit 114.

The control processors 118 and 119 are connected to the file server unit 106 through host interface controllers 122 and 123. The control processors 120 and 121 are connected to the fiber channel loops 137 and 138 through drive interface controllers 126 and 127. The drives 115, 116 and 117 are connected to the fiber channel loops 137 and 138. The control processors 118 and 119 control the transmission of data between the file server unit 106 and the cache memory 128, and the control processors 120 and 121 control the transmission of data between the cache memory 128 and the drives 115, 116 and 117.

A common control memory 129 is accessible from the control processors 118, 119, 120 and 121, and stores common control data for processing the request of the disk control unit 114 for inputting/outputting data to and from the file server unit 106. The common control data 130 will be concretely described later. The cache memory 128 is accessible from the control processors 118, 119, 120 and 121, and is used for temporarily storing the data read out from the drives 115, 116 and 117. A cache slot 131 is a data management unit in the cache memory 128.

The control processors 118, 119, 120 and 121 exchange data and control signals with the cache memory 128 and the common control memory 129 via a signal line 132. In this embodiment, the control processors, common control memory and cache memory are connected by a common bus which, however, may be replaced by a crossbar switch.

The control processors 118, 119, 120 and 121 are further connected to a service processor 134 through a signal line 133 to execute the communication. Here, the service processor 134 is an input/output device that is connected to the disk control unit 114 and has console functions for accessing the internal configuration of the control unit 114, arrangement of the logical disk, logical unit and any other control data.

Upon receiving transmission requests from the control processors 118, 119, 120 and 121, the service processor 134 sends a notice from the disk control unit 114 to an external unit through a signal line 135. In this embodiment, the notice of the service processor 134 is connected to a computer in a remote maintenance center 136 through its own communication line 135. An example of the maintenance center 136 may be an ASSIST (advanced service support information system technology) center of the present applicant. Further, the notice may be sent to the maintenance center 136 from the service processor 134 through the LAN 104.

The applicant's ASSIST is a system which connects the computer system to the maintenance center through a communication circuit, sends the state of the computer to the maintenance center through the circuit, confirms the operating state of the system on the side of the maintenance center, and offers quick and timely maintenance service.

To update the common control data in the common control memory 129, the service processor 134 selects any one of the control processors 118, 119, 120 or 121 and sends a request for updating. Upon receipt of this request, the selected control processor updates the common control data 130 in the common control memory 129.

Next, the common control data 130 is described below.

The common control data 130 includes an address management table 200 (FIG. 2) and a faulty part management table 300 (FIG. 3). FIG. 2 shows the address management table 200. The table 200 exists in every disk control device 114 (FIG. 1), and enables the file server unit 106 to recognize the logical unit (hereinafter abbreviated as LU) in the disk control unit 114 inclusive of the magnetic disk unit portion 124, so that the LU can be used. There may exist a plurality of disk control units 114 for port A and port B through crossbar switches.

The address management table 200 includes four kinds of data: port No. 201, AL-PA (arbitrated loop physical address) 202, LUN (logical unit number) 203 and control device data 204.

Based on the address management table 200, the file server unit 106 determines the position of the LU in the disk control unit 114, inclusive of the magnetic disk unit portion 124, so that the data can be input and output. The control device data 204 enables the disk control unit 114 to receive a processing request, other than the normal data input/output processing, from the file server unit 106.

The control device is not represented when the control device data 204 is "NO", and the control device is represented when the control device data 204 is "YES". In this embodiment, the control device is represented when the port No. is A, AL-PA is EF, and LUN is 2, as well as when the port No. is B, AL-PA is E8, and LUN is 2. The content of the address management table 200 can be registered, deleted or altered upon an instruction from the service processor 134.

Next, described below is the faulty part management table 300 shown in FIG. 3. The table 300 exists in every disk control unit 114 and includes four kinds of data: entry No. 301, faulty part 302, part No. 303 and kind of part 304. The entry No. 301 stores the registered number; the faulty part 302 stores a part where a fault has occurred; the part No. 303 stores the number of the part where the fault has occurred; and the kind of part 304 stores the kind of the part where the fault has occurred.

The faulty part 304 that is, for example, "A" means that the fault is occurring in the file server unit 106, and the faulty part 304 that is "B" means that the fault is occurring in the subordinate part (back-end) lower than the disk control system 114.

At entry No. 1 in this embodiment, "file server" is registered as the faulty part, "107" (FIG. 1) is registered as the part No., and "A" is registered as the kind of part. At entry No. 2, "control processor" is registered as the faulty part, "120" is registered as the part No., and "B" is registered as the kind of part. At entry No. 3, "drive" is registered as the faulty part, "115" is registered as the part No., and "B" is registered as the kind of part. Namely, it is indicated that the file server 107 is not usable due to a fault, and the control processor 120 is faulty. The faulty part management table 300 is managed by a FIFO (first-in first-out) method.

Figure 4:
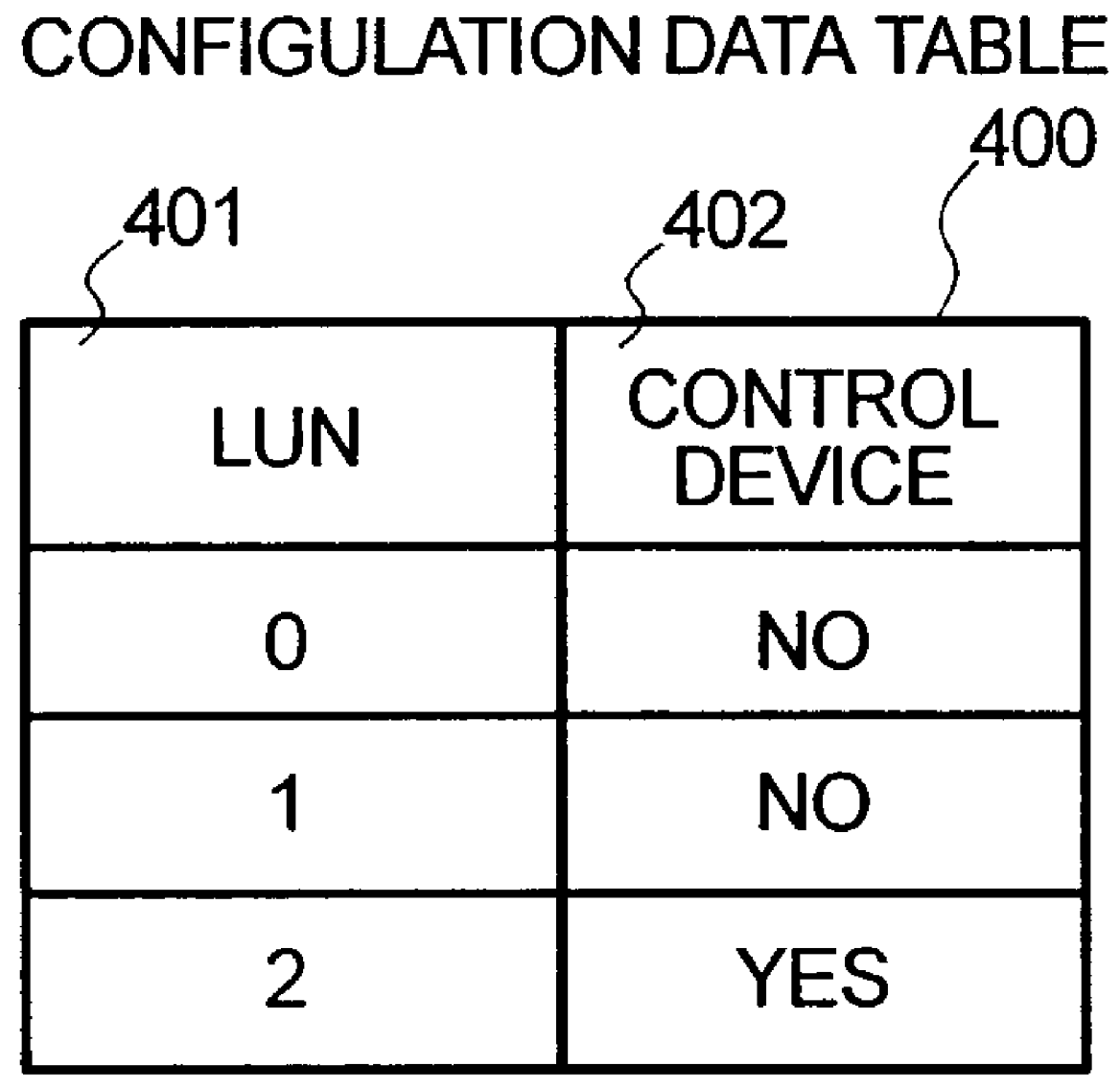

A configuration data table 400 shown in FIG. 4 exists in the file servers 107 and 108, respectively, (112 and 113 in FIG. 1) and stores data representing the LU that is the control device. The table 400 includes two kinds of data, i.e., LUN 401 and control device data 402.

LUN 401 stores the LUN No., and the control device data 402 stores "YES" when it is the control device, and stores "NO" when it is not the control device. In this embodiment, the LUN:2 is the control device. The above data is input to the configuration data table 400 in the manner described below.

To know what kind of LU has been defined in the disk control unit 114, the user issues a command for recognizing the LU from the file server 107 or 108. For example, when the HP-UX is the above-mentioned OS, an I/O scan command has been furnished as a standard feature. Upon executing this command, an inquiry command is issued to the disk control unit 114 making it possible to determine which LU is the control device defined in the disk control unit 114. When the above data are input, the file server 107 or 108 recognizes which LU is the control device. In this embodiment, LUN:2 is the control device.

The inquiry command queries the configuration data and attributes of the LU. Its details have been established in ANSI, SCSI-2 Standards, X3.131, 1994. Here, ANSI stands for the American National Standards Institute, and SCSI stands for small computer system interface.

System Operation

Next, described below are the operations of the file servers 107, 108, control processors 118, 119, 120 and 121 in the disk control unit 114, and the service processor 134, to which the invention is applied. The file server 107 receives the file input/output requests from the client computers 101, 102 and 103 through the LAN 104. The OS of the file server 107 separates the file input/output requests from the computers 101 to 103 into file input/output requests and data input/output requests. The file input/output requests are, for example, to request opening a file or closing a file, and the data input/output requests are to read/write to and from a drive.

The file server 107 sends the input/output request to the disk control unit 114 through the fiber channel interface 110. When, for example, the file server 107 sends an input/output request by using port A, the control processor 118 refers to the address management table 200 (FIG. 2), and sends the input/output request to AL-PA=EF, LUN=0. When the request that is received is one requesting writing, the data are received from the file server unit 106 and are written into the cache slot 131 to end the write request processing. When the request is for reading, the data are read from the cache slot 131.

When the cache slot 131 has data that are requested, such data are transmitted from the cache memory 128 to the file server unit 106. When the cache memory 128 has no such data, the control processor 118 instructs the control processors 120 and 121 to read the data from the drives 115, 116 and 117 onto the cache memory 128. The data which are in the cache slot 131 and which are to be written into the drives 115 to 117, are written into the drives while the control processors 120 and 121 are operating out of synchronism with the operation of the file server unit 106. That is, when the control processors 120 and 121 search the cache memory 128 and the cache slot 131 contains the data to be written into the drive 115, then, the data are written into predetermined drives 115 to 117.

The input/output request to the drives 115, 116 and 117 can be processed by either one of the control processors 120 or 121. When, for example, the fiber channel loop 137 has failed, the input/output request can be processed by using the control processor 121 and the fiber channel loop 138. Therefore, even when a fault occurs, the input/output request can be executed without interrupting the input and output to and from the drives 115 to 117.

Notice of Fault 1: Processing in the File Server Unit

Described below is the operation for notification of a fault occurrence in the file server unit 106. The file server 107 and the file server 108 are connected through two signal lines 109 and monitor each other's state.

Here, it is presumed that the file server 107 has broken down due to a fault. Upon detecting no response from the file server 107 through the signal lines 109, the file server 108 recognizes that the file server 107 has ceased to operate. Through the fiber channel interface 111, the file server 108 notifies the disk control unit 114 of this fault. Described below is a notification method.

The file server 108 refers to the configuration data table 113 (FIG. 1) and searches the LUN defining the control device. In this embodiment, it is presumed to be LUN:2. Concerning this LUN:2, notification is made of the faulty part: file server, part No. 107. This notification method is effected upon receiving a SCSI standard write command.

Notice of Fault 1: Processing in the Disk Control Unit

Figure 5:
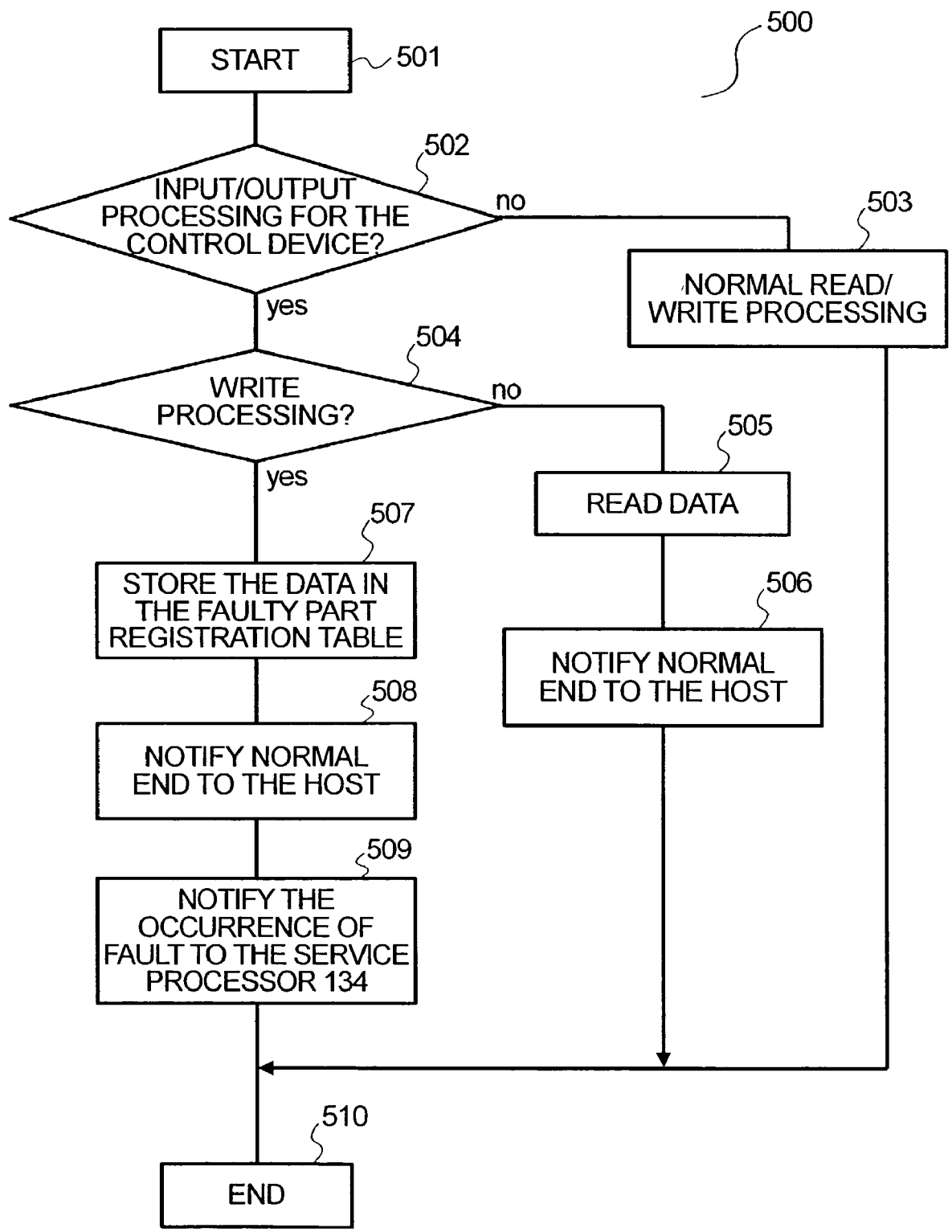
FIG. 5 is a flowchart of processing in a control processor that executes the fault notification process by using a write command according to the first embodiment of this invention.

FIG. 5 shows a flowchart 500 for read/write processing and notification of a fault executed by the control processors 118 to 119. The control processor 119 which has received a write command from the file server unit 106 starts retrieving the address management table 200 included in the common control data 130 on the common control memory 129 with LUN:2 as a retrieval key (501).

LUN:2 is defined as the control device (FIG. 4) and, hence, it is judged to be a request to the control device (502). When it is not a request to the control device, normal read/write processing is executed (503) to end the routine (510). When it is judged to be I/O to the control device (yes at 502), the control processor 119 judges whether it is a write request or a read request (504). When it is a write request, the write data are received from the file server 108, and "1" is registered at entry No. 301, "file sever" is registered at faulty part 302, "107" is registered at part No. 303, and "A" is registered at kind of part 304 in the faulty part management table 300 on the common control memory 129 (507).

After the registration step at 507, the control processor 119 notifies the file server 108 of the normal end of the write process (508). Thereafter, the control processor 119 notifies the service processor 134 of a fault occurrence through the signal line 133 (509). When it is a read request as judged at the branch processing 504, the data are read from the cache memory 128 or from the drives 115 to 117, are transferred to the file server, and the file server is notified of the normal end of the read process (506) to end the routine (510). The service processor 134 notifies the external remote maintenance center 136 of fault occurrence by sending the faulty part management table 300 specified by the control processor 119 through the signal line 135. Then, the fault data can be exchanged between the file server 107 or 108 and the disk control device 114 without providing any particular interface within a range of the normal SCSI standards.

Notice of Fault 2

Described below is the operation of fault notification when, for example, the control processor 118 has broken down. The control processors 118, 119, 120 and 121 monitor each other's state. The control processors write their times into the common control memory 129 at regular time intervals. These times are referred to by other control processors at regular intervals to check whether there is a difference among the times that are referred to. When there is no difference, it is judged that a control processor is halting.

In this embodiment, the control processor 118, which has broken down is detected by the control processor 119, and "2" is registered at entry No. 301, "control processor" is registered at faulty part 302, "118" is registered at part No. 303, and "B" indicating that the disk control unit 114 has failed is registered at kind of part 304 on the faulty part management table 300 (FIG. 3) placed on the common control memory 129. Thereafter, the control processor 119 notifies the service processor 134 of the occurrence of a fault through the signal line 133.

The service processor 134 sends all or part of the faulty part management table 300 specified by the control processor 119 to the external remote maintenance center 136 through the signal line 135 as notification of fault occurrence. Among the control processors 118 to 121, other processors operate in the same manner.

When the drive 115 has failed, the control processor 120 detects this state and registers "3" at entry No. 301, registers "drive" at faulty part 302, registers "115" at part No. 303 and registers "B" at kind of part 304 on the faulty part management table 300 in the same manner as described above.

Notice of Fault 3

Faults in the LAN 104 and in the fiber channel interfaces 110 and 111 can be detected by the file server unit 106, and notification can be sent to the disk control unit 114 through the control device 204 (FIG. 2).

Notification of faults detected by the OS and by the application operating in the file server 107 or 108, and faults in the hardware such as the host bus adapter and any other file server unit 106, can be sent from the file server 107 or 108 to the disk control unit 114 to notify the external unit of the network storage system 105 by the same method.

The remote maintenance center 136 is capable of easily discerning whether it is a fault in the file server unit 106 (fault in the front end) or a fault in the disk control unit 114 (fault at the back end) relying upon the kind of part in the notice of fault occurrence from the network storage system 105. Therefore, a fault in the file server can be quickly reported to the maintenance center of a maintenance and management company that is maintaining the file servers, and the file server can be quickly checked and attended to.

Further, even a light degree of fault in the client computer, which is not yet causing the client computer to break down, can be the subject of notification, making it possible to prevent the occurrence of a fault. For example, considered below is "5" of entry No. 301 in the faulty part management table 300 (FIG. 3). "Error log" has been registered at faulty part 302, "140" has been registered at part No. 303, and "A" indicating a fault in the file server unit 106 has been registered at kind of part 300.

At the maintenance center 136 that has received the notice of fault, the maintenance personnel is first allowed to check the error log file 140 in the file server 108 since the kind of fault is "A". As a result, if, for example, an occurrence of fault in the power source has been recorded, the power-source equipment can be maintained in advance before the power sources of the file server unit 106 all go out. Correspondence between the contents of the faulty part management table to the related kinds of parts and the practical equipment, has been given in advance, for example, as a list of items in a maintenance manual and as check codes and any other fault data.

As already described, a fault in the file server unit 106 can be reported to a unit outside of the system 105 through the disk control unit 114. Further, the faulty part can be easily distinguished, and the time can be shortened from detecting the fault to executing the maintenance.

Notification of a fault in the file server can be sent to an external unit from the disk control unit using neither hardware nor software for monitoring the file server from, for example, the client computers, and the cost of the system can be decreased.

Though this embodiment has illustrated the data storage medium with reference to the magnetic disk units 115 to 117, it is also possible to connect a magnetic tape, an optical disk, a magneto-optic disk or a floppy disk by changing the drive interface controllers 126 and 127.

The foregoing described an embodiment in which the file server unit 106 and the disk storage control unit 114 are connected through a fiber channel interface. Upon changing the host interface controllers 122 and 123, further, it is possible to connect them even through an SCSI interface.

Relying upon the above configurations, notification of a fault in the file server unit can be sent to a unit outside of the system through the disk control unit. In addition, the faulty part can be easily distinguished, and the time from detecting the fault to executing maintenance can be shortened. Neither a hardware means nor a software means is needed for monitoring the file server from the client computers, and the cost of the system can be lowered.

What is claimed is:

1. A network storage system comprising:

a file server unit for exchanging data with computers through a network;

a storage control unit for controlling the input/output of data relative to the file server unit; and a data storage medium for storing the data controlled by the storage control unit; wherein the file server unit has a function for detecting a fault and for transmitting data related to the fault to the storage control unit while specifying a predetermined logic unit of the storage control unit; and wherein the storage control unit comprises:

a faulty part management table;

a function for storing the data related to the fault transmitted from the file server unit in the faulty part management table separately from the data exchanged with the computers;

a function for detecting a fault other than the fault from the file server unit and for storing it in the faulty part management table; and a function for transmitting the whole or part of the content in the faulty part management table to an external unit.

2. A network storage system according to claim 1, wherein the storage control unit further includes a processor which is connected to the storage control unit, makes an access to the control data in the storage control unit, and transmits the whole or part of the content in the faulty part management table to an external communication line.

3. A network storage system according to claim 1, wherein the storage control unit is connected to an external maintenance center through a network, and the maintenance center discriminates in which one of the file server unit, network, hardware and software the fault has occurred relying upon the content of the faulty part management table transmitted to the external unit by the storage control unit.

4. A method of controlling a network storage system comprising:

a file server function for exchanging data with computers through a network;

a storage control unit for controlling the input/output of data relative to the file server function; and an input/output unit connected to the storage control unit and for making an access to fault related data in the storage control unit, the fault related data transmitted by the file server; wherein the file server function includes:

a first step for transmitting the fault related data or the data exchanged with the computers to the storage control unit;

a second step for executing read or write processing when the transmitted data are those data exchanged with the computers; and a third step for detecting a fault and transmitting first data related to the fault to the storage control unit while specifying a predetermined logic unit of the storage control unit.

5. A method of controlling a network storage system according to claim 4, wherein the first data includes second data related to a fault in the file server function.

6. A method of controlling a network storage system according to claim 5, wherein the second data related to the fault in the file server function includes an error log.

* * * * *